J. J. ROSS.
Refrigerator.
No. 218,138. Patented Aug. 5, 1879.
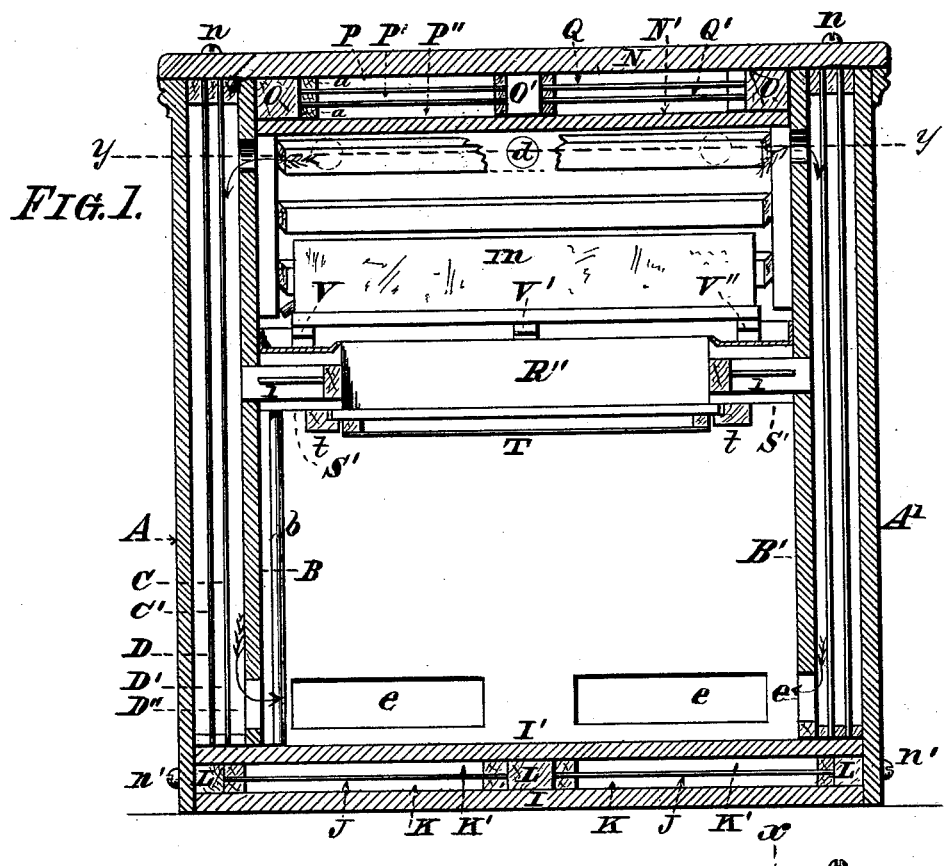
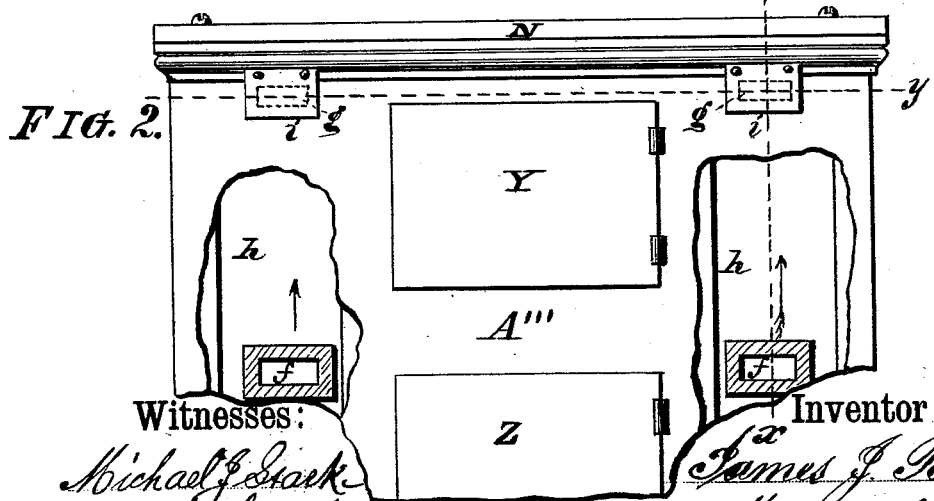

J. J. ROSS.
Refrigerator.
No. 218,138. Patented Aug. 5, 1879.
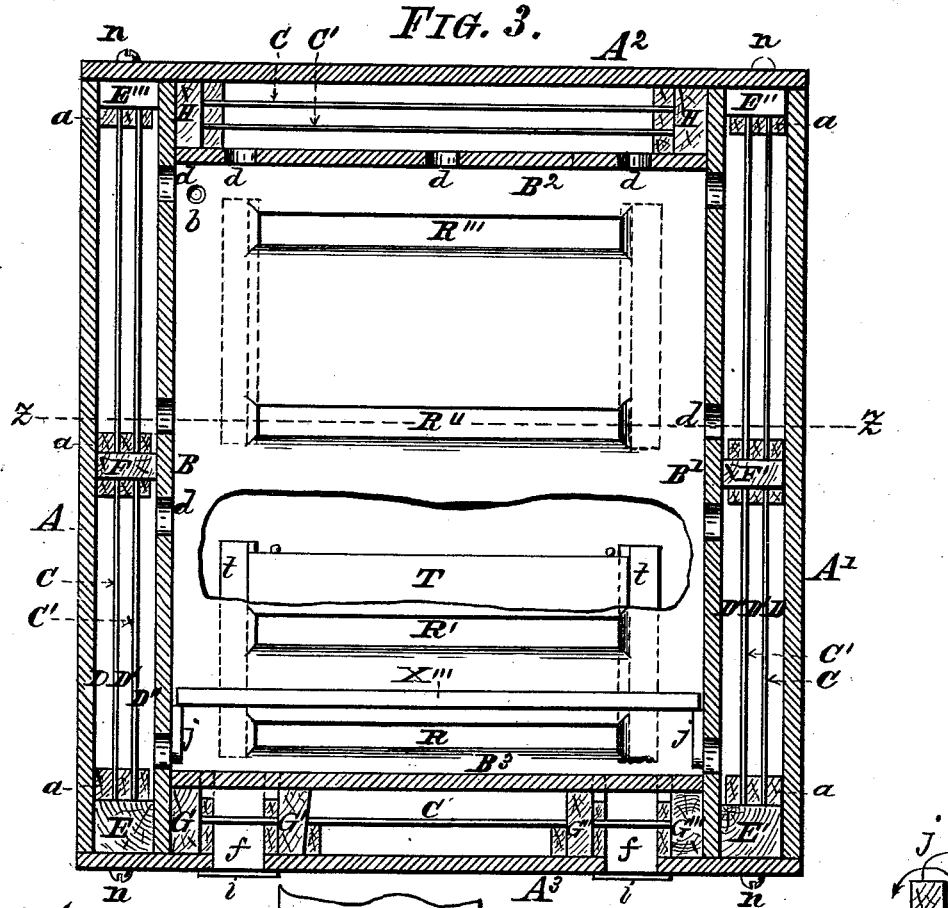
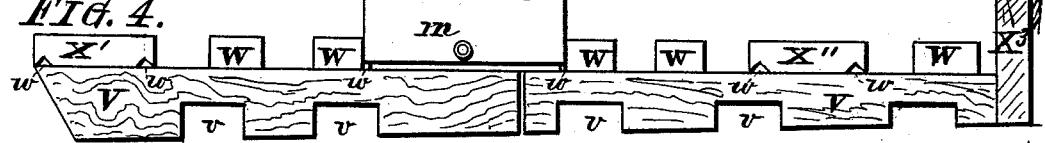
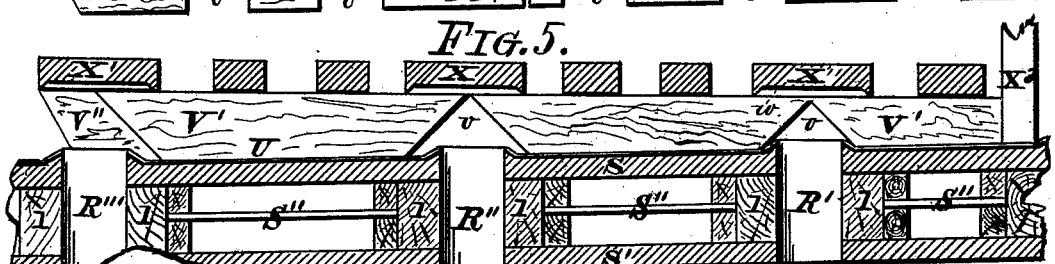
Witnesses:
Michael J. Stark
Frank Hirsch
Inventor:
James J. Ross
by Michael J. Stark
Attorney.

J. J. ROSS.
Refrigerator.
No. 218,138. Patented Aug. 5, 1879.
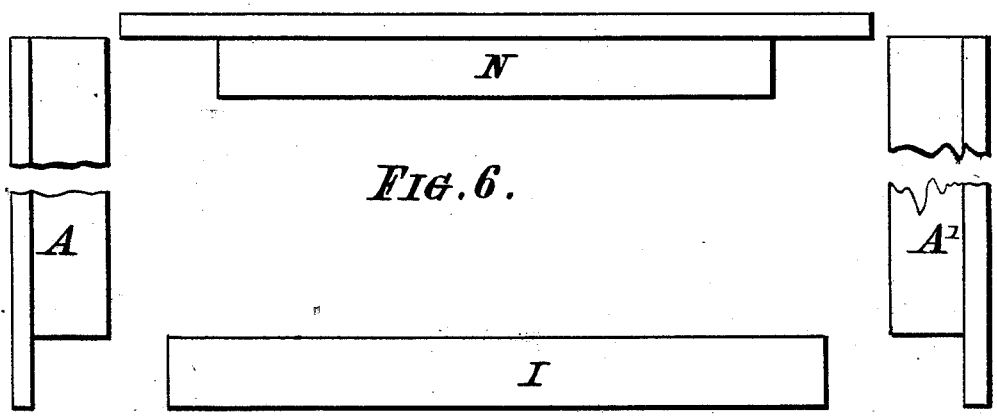
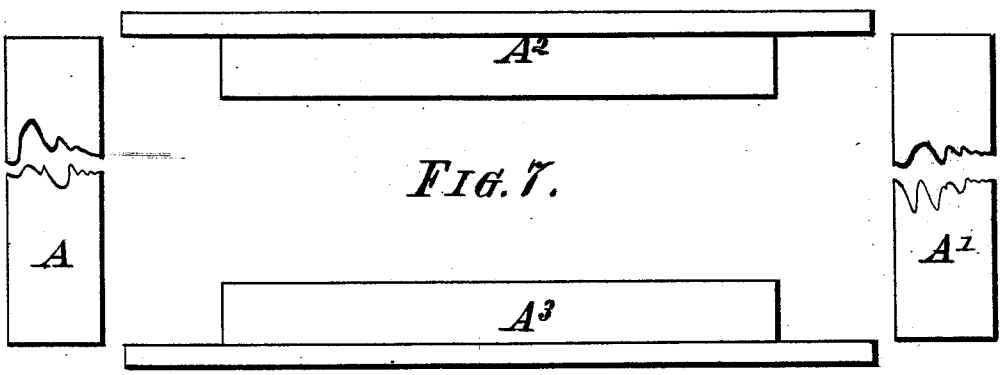
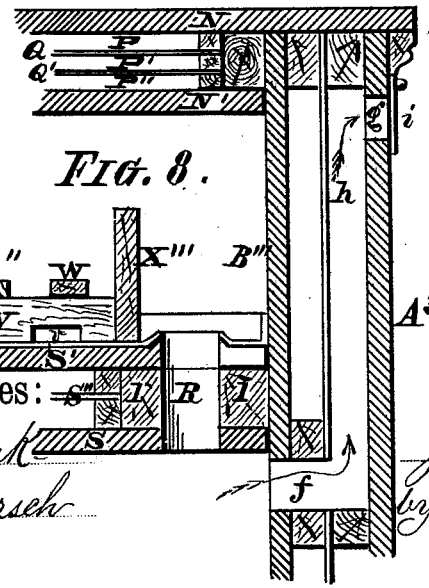
Witnesses:
Michael J. Stark
Frank Hirsch
Inventor:
James J. Ross
by Michael J. Stark
Attorney.

UNITED STATES PATENT OFFICE.

JAMES J. ROSS, OF BUFFALO, NEW YORK.

IMPROVEMENT IN REFRIGERATORS.

Specification forming part of Letters Patent No. 218,138, dated August 5, 1879; application filed February 14, 1879.

*To all whom it may concern:*

Be it known that I, JAMES J. ROSS, of Buffalo, in the county of Erie and State of New York, have invented certain new and useful Improvements on Refrigerators; and I do hereby declare that the following description of my said invention, taken in connection with the accompanying sheets of drawings, forms a full, clear, and exact specification, which will enable others skilled in the art to which it appertains to make and use the same.

The invention has general reference to receptacles for preserving animal, vegetable, and other perishable matter, by exposing them to a cold dry atmosphere; and my improvements, substantially as hereinafter first fully set forth and described, and then pointed out in the claims, are equally applicable for use on a large scale, where ice is stored in a sufficient quantity to last for a whole season, such as in packing-houses, breweries, hotels, steamboats, groceries, railroad-cars, and on a small scale in refrigerators for family use.

In describing the peculiar arrangement of parts and details of construction, I shall refer to the drawings already mentioned, in which—

Figure 1 is a transverse vertical sectional elevation in line $zz$ of Fig. 3. Fig. 2 is a front elevation, parts being broken to expose some of the interior arrangements. Fig. 3 is a horizontal sectional view in line $yy$ of Figs. 1 and 2. Fig. 4 is an end view of the ice-rack. Fig. 5 is a longitudinal sectional elevation of a fragment of the ice-chamber floor and the ice-rack. Fig. 6 is a front elevation of two of the side and the top and bottom sections. Fig. 7 is a plan of the side sections, and Fig. 8 a longitudinal sectional elevation in line $xx$ of Fig. 2.

Like letters of reference indicate corresponding parts in all the figures.

The first part of my invention consists in a refrigerator of a reservoir or reservoirs, serving to accumulate the obnoxious gases from the preserving-chamber, said reservoirs having inlet-passages within the preserving-chamber, close to and underneath the ceiling thereof, and outlets within the exterior walls of the structure, said outlets being closed by a flexible membrane, constructed to open automatically by the action of closing the preserving-chamber door, whereby the obnoxious gases are ejected from said reservoirs.

The second part of my invention consists in the combination, with the ice and preserving chambers, having a series of ducts to provide for a passage of the cold air from the ice to the preserving chamber, of a duct situated in the highest part of the preserving-chamber, to afford a passage of the warm air from the preserving-chamber to the ice-chamber, and a partition-wall traversing the ice-chamber in close proximity to the warm-air duct, said duct being constructed with capability of being taken down and placed over the said warm-air duct to cover the same, and thereby provide for means of traffic over said duct in passing into and out of said ice-chamber, whereby the ascending stratum of air is caused to take its course over the ice.

The third part of my invention relates to the peculiar construction of the sliding shutters, whereby condensation is prevented on the under side of said shutters.

The fourth part of my invention consists in the combination, with the ice and preserving chambers, having a series of ducts within the partition separating both chambers, of freezing-pans placed directly over said ducts, whereby the articles to be refrigerated, when placed underneath the pans around the ducts, are readily frozen, and when in such a condition may be preserved in a frozen state within the preserving-chamber.

A $A^1$ $A^2$ $A^3$ are the exterior walls of my refrigerator, and B B' B'' B''' the interior walls thereof. These walls are placed a sufficient distance apart to produce a space between them, which is partitioned by the walls C C' into three distinct and separate chambers, D D' D'', respectively, of which the outer one serves as a protection against the exterior warmer atmosphere coming in contact with the exterior walls, A $A^1$ $A^2$ $A^3$, and the inner one, D'', as a chamber or passage, as hereinafter to be referred to, while the middle one serves as a non-conductor of cold from the inside of the ice-chamber. These walls C C', I prefer to form of a pasteboard made of a canebrake stock or felt passed through a composition of hot linseed-oil and resin, whereby it is rendered water-proof and practically indestructible, and being at the same time a very bad conductor of heat. These boards I fasten to the structure by means of cleats a, to insure their producing a perfect isolation of the ice and preserving chambers from the exterior atmosphere.

In putting up this structure I first place the four vertical posts E, E′, E″, and E‴, and the posts G, G′, G″, and G‴, as well as the side posts, F F′, and rear posts, H H′, in position, and then secure the walls and partitions in their regular order. The floor of this structure is composed of the base-board I and the floor proper, I′, Fig. 1, both boards being placed far enough apart to admit of their separation by a partition-wall, J, thus producing two vacant spaces, K K′, said floor I′ being carried upon beams L L L, as clearly shown in said Fig. 1.

The ceiling for the ice-chamber is formed of the top board, N, and the ceiling proper, N′, placed a sufficient distance apart to admit of their separation by three dead-air spaces, P P′ P″, by means of the two partition-walls Q Q′.

It will now be readily observed that by separating the outer and inner walls of the entire structure by three dead-air spaces, of which the outer serves as a protection against heat, and the inner one to prevent radiation of cold, and the middle space as a neutral one between the two, no possible heat-abstracting influences can be brought to bear upon the interior from the exterior, or vice versa, and thus a perfect isolation of the ice and provision chambers is attained, resulting in a saving of the refrigerating agent.

The interior of my refrigerator is divided into the two usual compartments—the ice and preserving chambers—and these are separated from each other by means of a partition composed of a floor and ceiling, S S′, separated by two dead-air spaces, produced in a manner identical with that in which the sides and floors are attained. This partition or floor for the ice-chamber has four (more or less) passages, R R′ R″ R‴, placed a proper distance apart to be equally distributed over the entire floor-area, and extending to within a sufficient distance from the side walls to afford space for the ice-rack timbers, hereinafter to be referred to. These passages R serve as means for leading the cold air from the ice-chamber into the preserving-chamber, the arrangement being based upon the now well understood fact that cold air, being condensed and heavy, will descend, while warm air, being rarefied, will ascend; and these ducts are rendered adjustable with respect of their size or area by means of shutters T, placed under the ceiling S′, and arranged to slide within ways x secured to said ceiling S′.

The shutters T are made hollow, and have canebrake-felt particles, the same as that used for the partitions in the side and walls. This substance, as already stated, is water-proof and a bad conductor, and, owing to its latter quality and the fact that the shutter is made hollow, prevents any condensation and deposition of moisture, which would happen were they made solid and not so protected. These shutters are moved in their guides or ways until the proper size of apertures R is established, which a few trials will readily determine; and if care be taken that they are always brought back to that position after having been moved for some purpose or another, a perfect action is always and readily insured.

The floor in the ice-chamber is covered with a sheet-metal pan, U, Fig. 5, having the parts surrounding the passages R bent upward to prevent liquid assembling therein (in the pan) from dripping down into the preserving-chamber. Upon this pan is placed an ice-rack consisting of three longitudinal beams, V V′ V″, and a series of cross-timbers, W. Each of the longitudinal beams is composed of two pieces, so as to produce a rack formed in two sections, to enable its being passed into the ice-chamber through the door Y, and they are notched at v v to establish communication between the spaces longitudinally bounded by the beams V. The floor for the ice-chamber, being inclined rearwardly and sidewise, so as to bring the lowest point thereof into one corner of the structure, necessitates the beams V being tapered so as to bring the top surface of the ice-rack horizontally, said inclination being devised to allow the drippings from the melting ice to flow at once toward and be conducted away by the discharge-duct b.

Four (more or less, according to the number of ducts employed) of the transverse timbers are planks, X, X′, X″, and X‴, and they are so disposed upon the rack as to be opposite and over the said ducts R, they being of such a width as to exceed that of the ducts to some extent. The water resulting from the absorption of the ice runs down the sides of the planks and cross-timbers; but since the former are over the ducts there might be a possibility of the water accumulating in drops on the under side of the planks and then drip into the preserving-chamber. To avoid this objection I form longitudinally, near the edge of the lower side of these planks, V-shaped grooves or gutters w, so that the sides of these planks terminate in a sharp edge. This causes the drops to form on the sharp edge and to fall into the pan U far enough away from the duct to preclude the possibility of moisture to enter said ducts.

This arrangement of the planks W is an essential element in the construction of my refrigerator, since it will avoid any drippings from entering said preserving-chamber, thereby keeping the latter perfectly dry and wholesome.

In the side walls, B B¹ B″, I provide a series of apertures, d, close up to the top of the structure, which form a connection between the ice-chamber and the space D″, and in the preserving-chamber I provide another series of apertures, e, serving as escapes, said apertures being disposed in all the four walls, and of a sufficient size and number to produce a passage large enough to conduct the cold air down into the preserving-chamber, aside from that passing through the ducts R, already described. By this arrangement any warm air above the ice enters the apertures $d$ until sufficiently cooled by the walls of the ice-chamber to take a downward course and escape through the apertures $e$, near the bottom of the preserving-chamber.

In the front wall, near the ceiling S', I provide two openings, $f$, communicating with the exterior space between the front side, $A^3$, and the partition-wall C, and near the top in the outer wall, $A^3$, I provide two openings, $g$, serving as outlets. By this arrangement the obnoxious gases generated from fresh meat, &c., rising with the warm stratum of air to the highest point in the ceiling, (it being borne in mind that the latter is inclined rearwardly,) enter the apertures $f$ and accumulate in the spaces $h$, which serve as reservoirs for said gases, &c., the outlets being closed by valves $i$, consisting, preferably, of some flexible membrane, so arranged as to open the passages $g$ under slight pressure from inward.

Now, it is a well-known fact that when the door of an apartment is rapidly closed a current of air is forced into said apartment, and this principle applied to my refrigerator produces the effect that when the provision-chamber door Z is closed rapidly (as refrigerator-doors always are or should be to avoid ingress of warm air as much as possible) air is forced into said preserving-chamber, and causes an upward current in the reservoirs $h$, thus causing the valves $i$ to open and force the accumulated gases out through the openings $g$, their return or any ingress of air being prevented by the said valves $i$.

As already referred to, the warm air rises to the highest point in the provision-chamber, and the duct R, being the communicating agent between the preserving-chamber and the ice-chamber in the highest point, serves, therefore, as a passage for the warm air into the ice-chamber; but to prevent this air from passing under the ice-rack and store of ice, the plank $X'''$ is set vertically, as shown in Figs. 4 and 5, so as to close the space underneath the cross-timbers W, and thereby to cause the warm air to rise high enough to sweep over the ice, thus resulting in a greater reduction of the temperature of the air, and preventing honeycombing of the refrigerating agent on the under side, which, when large quantities thereof are stored, causes the lowermost part to be crushed, and thus wasted.

When ice is being placed into the ice-chamber or access had thereto, the plank $X'''$ is turned down, so as to close and bridge the passage R, and thus allow traveling over the same. This plank, when in a vertical position, is held therein by latches $j$, pivoted to the side walls, B B', as shown in Figs. 3 and 4.

In some refrigerators it is desirable to use a freezing mixture, solution, &c., to cause a reduction in temperature that cannot be obtained with ice alone. In this case I place tanks $m$, Figs. 1 and 4, into the spaces otherwise occupied by the planks X, the sides of which are continued beyond the bottom thereof, to produce sharp edges $w$, the same and for like purpose as the edges $w$ on the said planks. These tanks, being placed directly over the passages R, cause such a reduction in the temperature of the descending air as to freeze any animal or other substance which may be brought in immediate contact or in the vicinity of said tanks.

I have designed this apparatus with a special view of freezing fish or other animal matter, which are first placed into the ice-chamber below the tanks $m$, upon the ice-chamber floor around the ducts R, through which such matter is introduced into the ice-chamber, where they are subjected to the refrigerating action of the cold air, and thus readily frozen, in which state they are removed from the ice-chamber and placed in the preserving-chamber, thus preserving them for almost an indefinite space of time.

While the freezing of such fish, &c., is being accomplished I prefer to close the shutters T entirely, so as to confine the cold air within the ice-chamber, and after part of such matter is frozen and placed into the preserving-chamber, I open the passage $R'''$, so as to allow sufficient cold air to descend into the preserving-chamber to keep such fish, &c., in a frozen state.

I have heretofore said that the entire structure is capable of being knocked down and re-erected wherever desired. To attain this feature I construct the entire apparatus of seven separate and distinct sections, viz., the four sides, the top and bottom, and the ice-chamber-floor sections, two side and top and bottom sections being shown in Fig. 6, and the four side sections in Fig. 7. In these figures the sections A, $A^1$, $A^2$, and $A^3$ are representing the four side sections, and I and N the bottom and top sections, respectively.

Here, it will be observed, the side walls, A $A^1$, are flush on the top, and rest upon the bottom section, except the front walls of the sections, which are carried down to the lower edge of the said floor-section, and thereby serve as medium to secure the sides to the bottom section by means of screws, &c., $n$. The top section passes into the interior space bounded by the side sections, except the top board thereof, which rests upon said side sections, and thereby also serves as a medium to secure the same by means of screws $n'$.

The beams or joists $i$ of the ice-chamber-floor section are carried beyond the said floor to form tenons engaging mortises in the walls B B', and the floor and ceiling S S'', as well as all the other appurtenances, being secured to said joists, form one complete and compact mass.

My said refrigerator, being thus composed of seven separate and distinct sections, can be readily bisected or put up.

When knocked down they occupy considerably less space, and are, therefore, more readily shipped, at less expense, and with greater facility than when shipped entire; but there is a further advantage in this method of construction, particularly in large refrigerators capable of holding tons of ice or a supply lasting an entire season, which is, that the entire apparatus can be manufactured in a shop where all the facilities and labor-saving machines are at hand and accessible to produce perfect work at the lowest possible cost. Such has not heretofore been accomplished, and all refrigerators of such large sizes have had to be built upon the places they were intended to occupy, and could not be removed without being practically destroyed.

My refrigerator can be perfectly built in a shop, taken down in a short space of time, shipped to its designated place, and finally erected by any one capable of handling the few necessary tools for such purpose.

That the result of this construction cannot be but profitable to the buyer and user, and result in cheapening the cost of production, is perfectly evident, bearing in mind the fact that hand-work away from any working and labor-saving appliances is extremely slow and expensive.

I have stated that the partitions in the side, &c., walls are made of canebrake-felt. Such material possesses superior qualities over other similar matter, and it will form subject-matter of separate applications for Letters Patent, and will not, therefore, be here described.

Having thus fully described my invention, I claim as new and desire to secure to me by Letters Patent—

1. In a refrigerator, the reservoir $h$, serving to accumulate the obnoxious gases from the preserving-chamber, said reservoir having an inlet-passage, $f$, within said preserving-chamber, close to and underneath the ceiling thereof, and an outlet-passage, $g$, within the wall $A'''$, underneath the roof of the refrigerator, said passage $g$ being closed by a flexible membrane, $i$, constructed to open automatically by the action of closing the door Z in said preserving-chamber, substantially as and for the object specified.

2. The combination, with the ice and preserving chambers, having the ducts $R'''$, $R''$, and $R'$, provided with shutters T, of the duct R, serving as a passage for the warmer stratum of air from the preserving to the ice chamber, and the partition-wall $X'''$, traversing the said ice-chamber in a line parallel with the duct R, said partition being constructed with capability of being taken down and placed over the duct R to cover the same, and thereby provide for means of traffic over said duct in passing into and out of said ice-chamber, as and for the use and purpose specified.

3. In a refrigerator having ducts to lead the air from the ice-chamber to the preserving-chamber, the combination, with such ducts, of shutters T, said shutters being made hollow, as specified, to prevent condensation upon their surfaces, as and for the object stated.

4. The combination, with the ice and preserving chambers, having a series of connecting-ducts, R, of the pans $m$, placed directly over said ducts, and having their sides terminate in sharp edges $w$, as and for the purpose described.

In testimony that I claim the foregoing as my invention I have hereto set my hand and affixed my seal in the presence of two subscribing witnesses.

JAMES J. ROSS. [L. S.]

Attest:
MICHAEL J. STARK,
FRANK HIRSCH.